United States Patent
Aissi et al.

(10) Patent No.: US 8,667,336 B2
(45) Date of Patent: Mar. 4, 2014

(54) FLASH MEMORY-HOSTED LOCAL AND REMOTE OUT-OF-SERVICE PLATFORM MANAGEABILITY

(75) Inventors: Selim Aissi, Beaverton, OR (US); Hani Elgebaly, Beaverton, OR (US); Venkat Gokulrangan, Portland, OR (US); Ayeshwarya B. Mahajan, Bangalore (IN); Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 11/763,208

(22) Filed: Jun. 14, 2007

(65) Prior Publication Data

US 2008/0313489 A1 Dec. 18, 2008

(51) Int. Cl.
*G06F 11/00* (2006.01)
(52) U.S. Cl.
USPC .............................. 714/42; 710/48
(58) Field of Classification Search
USPC .......................................... 714/42
See application file for complete search history.

(56) References Cited

U.S. PATENT DOCUMENTS

| 5,732,268 | A | * | 3/1998 | Bizzarri | 713/2 |
|---|---|---|---|---|---|
| 6,282,675 | B1 | * | 8/2001 | Sun et al. | 714/36 |
| 6,466,998 | B1 | * | 10/2002 | Bennett | 710/48 |
| 6,816,985 | B2 | * | 11/2004 | Ali-Santosa et al. | 714/38 |
| 7,055,062 | B2 | * | 5/2006 | Shah et al. | 714/15 |
| 7,237,102 | B2 | * | 6/2007 | Rothman | 713/1 |
| 2004/0268116 | A1 | * | 12/2004 | Vasisht et al. | 713/100 |
| 2006/0047876 | A1 | * | 3/2006 | Stultz | 710/260 |
| 2006/0271773 | A1 | * | 11/2006 | Marquiz | 713/1 |
| 2007/0156949 | A1 | * | 7/2007 | Rudelic et al. | 711/103 |
| 2008/0046546 | A1 | * | 2/2008 | Parmar et al. | 709/220 |
| 2008/0077749 | A1 | * | 3/2008 | Cohen | 711/152 |
| 2008/0235436 | A1 | * | 9/2008 | Zimmer et al. | 711/103 |

* cited by examiner

*Primary Examiner* — Kamini Patel
(74) *Attorney, Agent, or Firm* — Barnes & Thornburg LLP

(57) ABSTRACT

A method, apparatus, and system are disclosed. In one embodiment, the method determines whether one or more manageability conditions are present in a computer system, and then invokes an out-of-service manageability remediation environment stored within a portion of a flash device in the computer system when one or more manageability conditions are present.

9 Claims, 3 Drawing Sheets

FLASH MEMORY-HOSTED LOCAL AND REMOTE OUT-OF-SERVICE PLATFORM MANAGEABILITY

FIELD OF THE INVENTION

The invention relates to flash memory. More specifically, the invention relates to accessing and using a portion of a flash memory to store and utilize a system remediation environment.

BACKGROUND OF THE INVENTION

Remediation environments such as remediation operating systems and diagnostic and repair code are helpful to increase the robustness of computer systems. Remediation code is utilized to boot a computer system safely when the normal boot process becomes corrupt. In certain scenarios, the boot process can become corrupt when unsafe or unverified code is loaded during the operating system load process. For example, a virus can load corrupt code modules to damage the system. Another way in which the normal boot process becomes corrupt is due to a damaged hard disk drive that stores the operating system. Certain sectors in a hard drive may become unreadable and thus, portions of the operating system are not able to load correctly. Remediation operating systems are usually stored within a protected area of the hard disk drive on a computer system or stored remotely from the computer system.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, apparatus, and system for hosting local and remote out-of-service platform manageability in a flash memory are described. In the following description, numerous specific details are set forth. In other instances, well-known elements, specifications, and protocols have not been discussed in detail in order to avoid obscuring the present invention.

References to "one embodiment", "an embodiment", "example embodiment", "various embodiments", "some embodiments", "many embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

Figure 1:
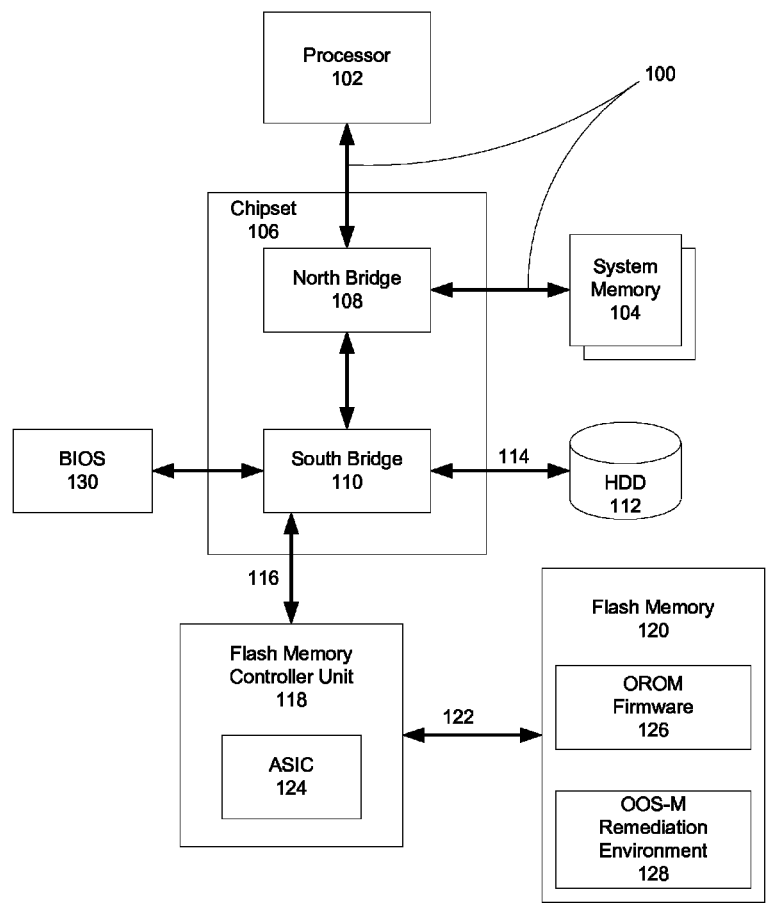
FIG. 1 is a block diagram of one embodiment of a computer system with a flash memory device to store a remediation environment and a flash memory controller to detect conditions that occur within the computer system necessitating an invocation of the remediation environment.

FIG. 1 is a block diagram of one embodiment of a computer system with a flash memory device to store a remediation environment and a flash memory controller to detect conditions that occur within the computer system necessitating an invocation of the remediation environment. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100. In another embodiment, there are multiple central processors coupled to processor-memory interconnect 100 (multiple processors are not shown in this figure).

Processor-memory interconnect 100 provides the central processor 102 and other devices access to the system memory 104. A system memory controller controls access to the system memory 104. In one embodiment, the system memory controller is located within the north bridge 108 of a chipset 106 that is coupled to processor-memory interconnect 100. In another embodiment, a system memory controller is located on the same chip as central processor 102. Information, instructions, and other data may be stored in system memory 104 for use by central processor 102 as well as many other potential devices.

The chipset 106 also includes a south bridge 110 coupled to north bridge 108 through an interconnect 112. In many embodiments, interconnect 112 is a hub-link interconnect. I/O devices are coupled to the south bridge 110 of the chipset 106 through one or more I/O interconnects. For example, in many embodiments, hard disk drive (HDD) 112 is coupled to the south bridge 110 through a serial advanced technology attachment (SATA) interconnect 114, though HDD 112 may be connected through other interconnects in different embodiments.

In many embodiments, the system also includes one or more PCI Express (PCIe) point-to-point interconnects, such as interconnect 116. PCIe interconnect 116 couples the south bridge 110 to a flash memory controller unit 118, which, in turn, is coupled to a flash memory 120 through flash memory interconnect 122 in many embodiments. In many embodiments, flash memory 120 comprises a NAND flash memory array.

Additionally, in many embodiments, an application specific integrated circuit (ASIC) 124 is located within the flash memory controller unit 118. In other embodiments, the ASIC 124 is external to the flash memory controller unit 118 and is coupled separately coupled to the south bridge 110.

Flash memory controller unit 118 provides access to the flash memory 120 to the rest of the system in FIG. 1. When the system boots, control code within an option read only memory (OROM) firmware 126 stored in the flash memory 120 manages and configures the flash memory 120.

In many embodiments, the flash memory is comprised of a number of blocks, each block capable of storing an amount of data. In some embodiments, the ASIC 124 controls access to each flash memory block. The ASIC 124 supports a Device Lock Table that is mapped to flash memory blocks. Additionally, the ASIC 124 supports an Access Control List (ACL) that specifies the access rights for each block. In different embodiments, the Device Lock Table and ACL may be located within the ASIC 124, within the flash memory controller unit 118, within the flash memory 120, or in another device within the computer system.

In some embodiments, the ASIC 124 receives one or more pre-boot commands to lock one or more flash memory 120 blocks from access. In some embodiments, a basic input/output system (BIOS) 130 includes instructions to initialize the computer system during the boot process. The BIOS 130 may include instructions to lock one or more flash memory 120 blocks. The lock instructions inform the ASIC 124 what blocks to lock. Additionally, in some embodiments, the one or more lock instructions utilize the ACL to determine what entities, if any, are allowed to access certain restricted blocks as well as whether the accesses are limited to reads, reads and writes, or neither reads nor writes.

After the ASIC 124 has executed the lock instructions on one or more blocks within flash memory 120, the lock will be enforced until the ASIC 124 resets in many embodiments. This occurs usually during a computer system reboot.

An out-of-service manageability (OOS-M) remediation environment 128 is stored within a portion of the flash memory 120 in many embodiments. This remediation environment may include an operating system, diagnostic and repair code, or any other type of control code to remedy a problem that may occur within the host operating system stored on the HDD 112.

In different embodiments, the OOS-M remediation environment 128 may allow diagnostics and repair of computer system issues such as host operating system registry corruption, missing or damaged system and driver files within the host operating system, hard disk metadata corruption (such as a corrupt partition table or boot sector), file system metadata corruption within the host operating system, installation of problematic or incompatible drivers within the host operating system, installation of incompatible operating system service packs and patches, corrupt boot configuration data, and bad system memory or hard disk drive hardware.

Figure 2:
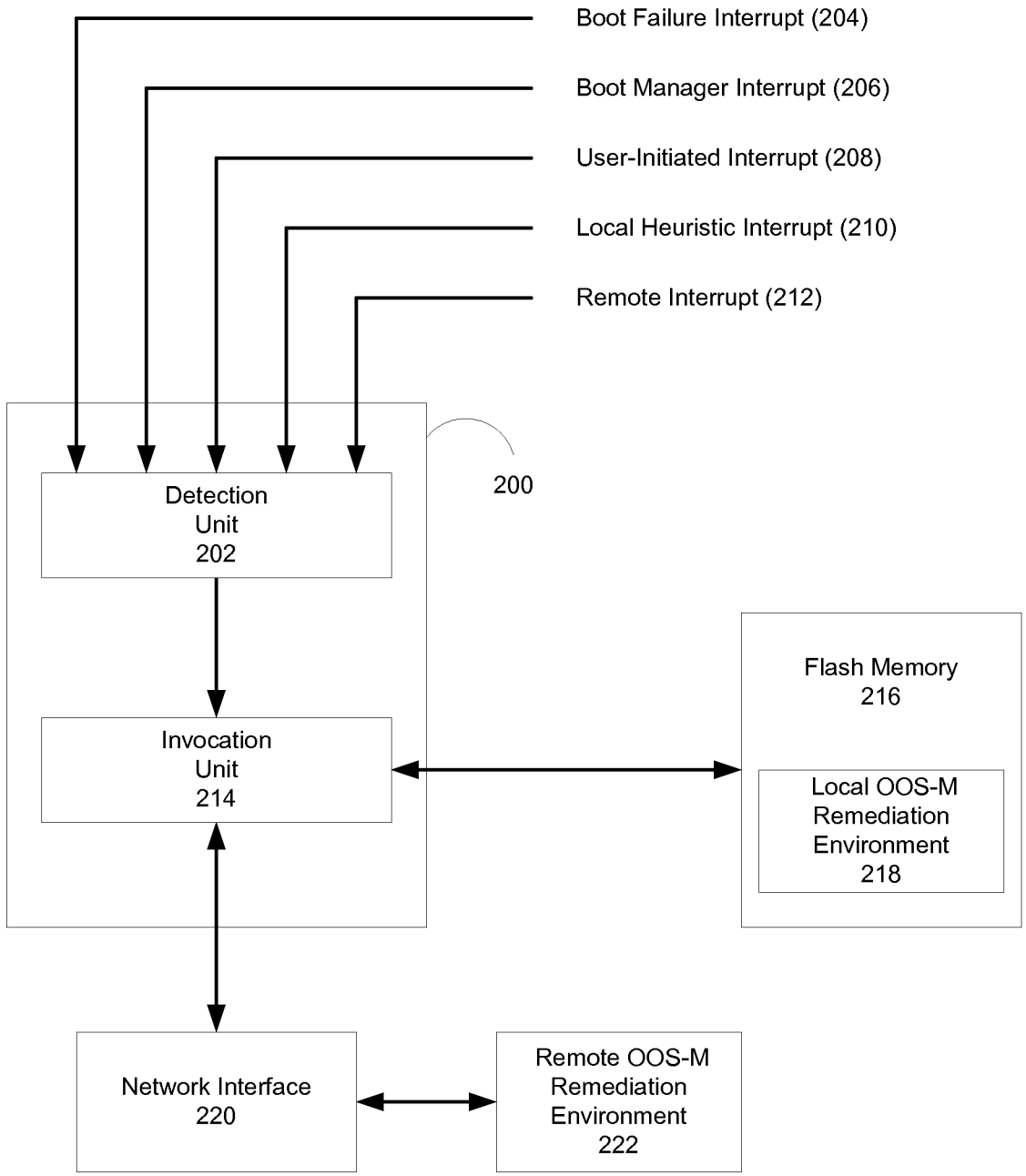
FIG. 2 describes an embodiment of a device to detect manageability conditions within a computer system and invoke a remediation environment in response to the manageability conditions.

FIG. 2 describes an embodiment of a device to detect manageability conditions within a computer system and invoke a remediation environment in response to the manageability conditions. A manageability condition is one in which the host operating system residing on the computer system is not to be utilized for one or more reasons and a remediation environment is to be brought up instead. For example, manageability conditions can occur when the host operating system is compromised, or an entity, such as a user or remote information technology (IT) support personnel instruct the computer system to enter a remediation environment. In many embodiments, a flash memory controller 200 includes a detection unit 202 and an invocation unit 214 to handle situations when manageability conditions occur. The detection unit can detect when a manageability condition occurs. In some embodiments, the detection takes place when an interrupt is sent to the detection unit. Although the interrupt arrives on an interconnect coupled to the flash memory controller 200, five different types of interrupts corresponding to different manageability conditions are illustratively shown as separate entities in FIG. 2.

These manageability conditions include a boot failure interrupt 204. A boot failure may occur when the BIOS instructs the computer system to load the operating system from the hard disk drive and a critical file is missing or corrupt. Depending on the type of file, this may cause a catastrophic boot failure because the operating system may not be capable of working without the file. Thus, the operating system may lock up and fail to boot. At this time, a critical system failure interrupt may be sent to the flash memory controller 200 and the detection unit 202 within the controller will receive the interrupt and detect a particular manageability condition.

Another manageability condition includes a boot manager interrupt 206. A boot manager interrupt may not be as critical a failure. A boot manager may have loaded into system memory to supervise the operating system boot process. A non-critical file may be missing or corrupt and, although not essential to the host operating system booting, the missing or corrupt file will alert the boot manager that something has changed from the previous boot, thus, the boot manager may issue an interrupt that will be sent to the flash memory controller 200 detection unit 202.

Alternatively, the operating system may be fully operational and running normally but something has alerted a user using the system that there may have been something compromise the integrity of the host operating system. Thus, the user may issue a user-initiated interrupt 208 manageability condition to tell the system to reboot and load a remediation environment.

Additionally, local heuristics within the computer system may also issue a local heuristic interrupt 210 manageability condition to initiate a reboot to load a remediation environment. For example, anti-virus software may detect a virus that has already compromised the system, thus the software will inform the flash memory controller 200 detection unit 202.

A remote interrupt 212 manageability condition can also cause a reboot and loading of a remediation environment. Remote interrupts may be initiated by an IT department remotely to load a remediation environment. In other embodiments, additional interrupt events apart from the five listed above may occur that would initiate a reboot and loading of a remediation environment.

Once the detection unit 202 has detected a manageability condition, it informs an invocation unit 214. The invocation unit 214 invokes the remediation environment. In some embodiments, the invocation unit 214 loads a local OOS-M remediation environment 218 stored within a portion of the flash memory 216 located on the system. In other embodiments, the invocation unit 214 loads a remote OOS-M remediation environment 222 through a network interface 220. In some embodiments, the invocation unit 214 attempts to load the local remediation environment 218 first, and if the local remediation environment 218 fails to load, then the invocation unit 214 attempts to load the remote remediation environment 222. In other embodiments, the invocation unit 214 attempts to load the remote remediation environment 222 first, and if the remote remediation environment 222 fails to load, then the invocation unit 214 attempts to load the local remediation environment 218.

Figure 3:
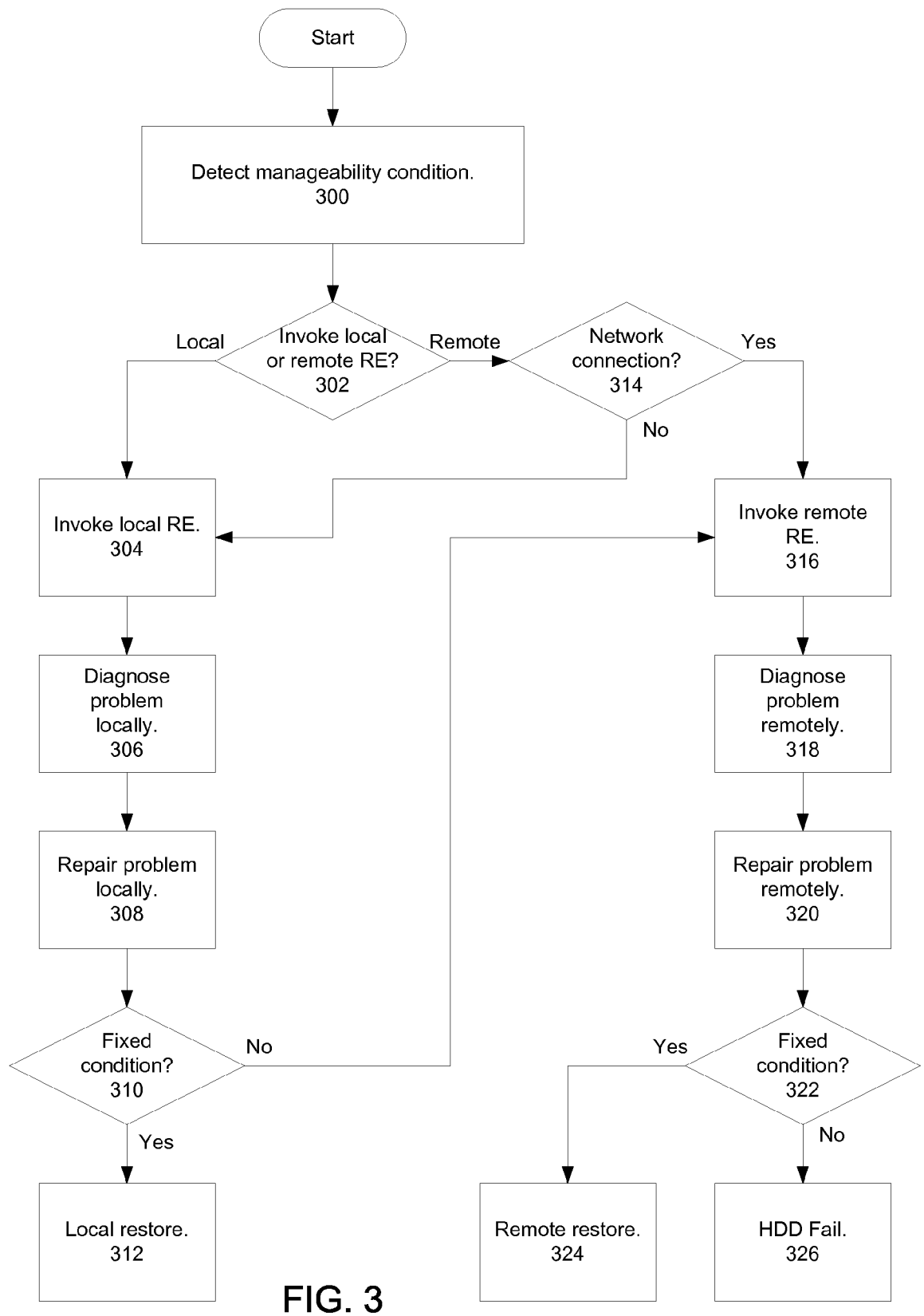
FIG. 3 is a flow diagram of one embodiment of a process to detect manageability conditions and invoke one or more remediation environments in response to the detection.

FIG. 3 is a flow diagram of one embodiment of a process to detect manageability conditions and invoke one or more remediation environments in response to the detection. The process is performed by processing logic that may comprise hardware (circuitry, dedicated logic, etc.), software (such as is run on a general purpose computer system or a dedicated machine), or a combination of both. Referring to FIG. 3, the process begins by processing logic detecting a manageability condition (processing block 200). In different embodiments, manageability conditions can be a host operating system boot failure, a boot-manager detecting the host operating system not booting, a user initiated trigger, a local heuristic trigger, and a remote console trigger. These manageability conditions are described in detail above in reference to FIG. 2.

Next, processing logic determines whether a local or remote remediation environment (RE) should be invoked (processing block 302). A user, a remote IT administrator, local heuristics within the computer system, or another agent may decide whether the local or remote RE should be invoked. In some embodiments, the decision may be a result of what type of manageability condition has occurred. If a local RE is scheduled to be invoked, then processing logic invokes the local RE from a locked portion of a flash memory device on the computer system (processing block 304). Once the local RE has been invoked (e.g. loaded after a system reboot), processing logic diagnoses the problem that created the manageability condition locally within logic in the local RE (processing block 306).

Then, processing logic attempts to repair the problem locally (processing block 308) using the local RE. Next processing logic determines whether the manageability condition has been fixed (processing block 310). If the condition has been fixed, then processing logic utilizes the local RE to do a local restore of the system (processing block 312). If the problem has not been fixed due to some continuing issue that the local RE is not capable of fixing, then processing logic attempts to invoke a remote RE (processing block 316).

Returning to processing block 302, if a remote RE is to be invoked, then processing logic determines whether there is a network connection available to access the remote RE (processing block 314). If not, then the local RE is invoked (processing block 304) and the local diagnostic and repair processing blocks are processed (as described above). Otherwise, if there is a network connection, then processing logic attempt to invoke the remote RE (processing block 316).

Once the remote RE is invoked, processing logic diagnoses the problem that created the manageability condition remotely within the remote RE (processing block 318). Then, processing logic attempts to repair the problem remotely (processing block 320) using the remote RE. Next, processing logic determines whether the manageability condition has been fixed (processing block 322). If the condition has been fixed, then processing logic utilizes the remote RE to do a remote restore of the system (processing block 324). If the condition has not been fixed, then processing logic puts the system into a failure state, such as a HDD fail state (processing block 326). If the system has been restored, in some embodiments, the remote RE may implement an agent monitor to monitor the system for further manageability conditions more closely.

Thus, embodiments of a method, apparatus, and system for hosting local and remote out-of-service platform manageability in a flash memory are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    determining whether one or more manageability conditions are present in a computer system;
    attempting to load, in response to one or more manageability conditions being present, an out-of-service manageability remediation environment, the out-of-service manageability remediation environment comprising one of:
        (i) a local out-of-service manageability remediation environment stored within a portion of a flash device in the computer system wherein the local out-of-service manageability remediation environment is different from a host operating system of the computer system and is configured to locally diagnose one or more host operating system problems that created the manageability condition and locally attempt to repair the one or more diagnosed host operating system problems; or
        (ii) a remote out-of-service manageability remediation environment stored external to the computing system, wherein the remote out-of-service manageability remediation environment is different from the host operating system of the computer system and is configured to diagnose the one or more host operating system problems that created the manageability condition and attempt to repair the one or more diagnosed host operating system problems;
    determining whether the out-of-service manageability remediation environment has failed to load;
    in response to determining that the out-of-service manageability remediation environment has failed to load, attempting to load (i) the local out-of-service manageability remediation environment in response to determining that the remote out-of-service manageability remediation environment has failed to load or (ii) the remote out-of-service manageability remediation environment in response to determining that the local out-of-service manageability remediation environment has failed to load; and
    rebooting the computer system under the control of the host operating system in response to the one or more diagnosed host operating system problems being repaired by the local out-of-service manageability remediation environment or the remote out-of-service manageability remediation environment.

2. The method of claim 1, wherein at least one of the one or more manageability conditions is one of a host operating system boot failure, a boot-manager detects the host operating system not booting, a user initiated trigger, a local heuristic trigger, and a remote console trigger.

3. The method of claim 1, further comprising:
    locking the portion of the flash device with the stored remediation environment from allowing updates when a host operating system is booted.

4. The method of claim 3, further comprising:
    an application specific integrated circuit (ASIC) unlocking the portion of flash device with the stored remediation environment to allow updates when the host operating system is not booted.

5. The method of claim 2, further comprising:
    rebooting the system when a manageability condition appears while the host operating system is booted; and
    upon reboot after the appearance of a manageability condition, loading the remediation environment from the flash device instead of the host operating system.

6. The method of claim 1, wherein the host operating system problem further comprises the corruption of one or more pieces of data utilized by the host operating system.

7. The method of claim 6, further comprising the remediation environment attempting to restore the one or more pieces of corrupt data to a pre-corrupt state.

8. The method of claim 1, wherein attempting to load, in response to one or more manageability conditions being present, the out-of-service manageability remediation environment comprises attempting to load the remote out-of-service manageability remediation environment; and wherein attempting to load, in response to determining that the out-of-service manageability remediation environment has failed to load, comprises attempting to load the local out-of-service manageability remediation environment.

9. A method, comprising:

determining whether a manageability condition has occurred in a computer system;

selecting, as a function of the manageability condition, an out-of-service manageability remediation environment from:

(i) a local out-of-service manageability remediation environment stored within a portion of a flash device in the computer system wherein the local out-of-service manageability remediation environment is different from a host operating system of the computer system and is configured to locally diagnose one or more host operating system problems that created the manageability condition and locally attempt to repair the one or more diagnosed host operating system problems; or (ii) a remote out-of-service manageability remediation environment stored external to the computing system, wherein the remote out-of-service manageability remediation environment is different from the host operating system of the computer system and is configured to diagnose the one or more host operating system problems that created the manageability condition and attempt to repair the one or more diagnosed host operating system problems;

attempting to load, in response to the manageability condition, the selected out-of-service manageability remediation environment; and rebooting the computer system under the control of the host operating system in response to the one or more diagnosed host operating system problems being repaired by the selected out-of-service manageability remediation environment.

\* \* \* \* \*